(12) United States Patent
Wang

(10) Patent No.: US 8,574,394 B2
(45) Date of Patent: Nov. 5, 2013

(54) METHOD FOR PREPARING A MOISTURE CURABLE HOT MELT ADHESIVE

(75) Inventor: Yongxia Wang, Bridgewater, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 839 days.

(21) Appl. No.: 11/962,872

(22) Filed: Dec. 21, 2007

(65) Prior Publication Data

US 2009/0159205 A1    Jun. 25, 2009

(51) Int. Cl.
| | |
|---|---|
| C04B 37/00 | (2006.01) |
| C09J 4/00 | (2006.01) |
| C09J 101/00 | (2006.01) |
| C09J 201/00 | (2006.01) |
| C08G 18/10 | (2006.01) |
| C08G 18/00 | (2006.01) |

(52) U.S. Cl.
USPC ............ 156/325; 156/331.4; 528/59; 528/65

(58) Field of Classification Search
USPC ............................ 156/325, 331.4; 528/59, 65
See application file for complete search history.

(56) References Cited

U.S. PATENT DOCUMENTS

| | | | |
|---|---|---|---|
| 4,719,278 A | | 1/1988 | Wellner et al. |
| 4,778,845 A | | 10/1988 | Tschan et al. |
| 5,869,593 A | * | 2/1999 | Helmeke et al. ............... 528/83 |
| 2004/0087754 A1 | * | 5/2004 | Foley et al. ..................... 528/59 |
| 2005/0020706 A1 | * | 1/2005 | Kollbach et al. .............. 521/159 |
| 2005/0143549 A1 | * | 6/2005 | Schijndel et al. ............... 528/44 |

FOREIGN PATENT DOCUMENTS

| | | |
|---|---|---|
| EP | 1811006 | 7/2007 |
| GB | 2427610 | 1/2007 |

* cited by examiner

*Primary Examiner* — Michael Orlando
(74) *Attorney, Agent, or Firm* — James E. Piotrowski; Steven C. Bauman

(57) ABSTRACT

Moisture curable reactive hot melt adhesive compositions are prepared using a novel two-step polymerization process. Resulting adhesives have improved green strength.

15 Claims, 2 Drawing Sheets

Figure 1:
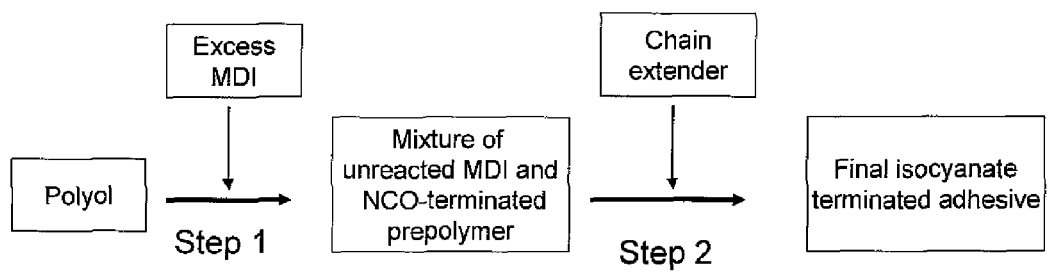

Comparison of green strength and set speed

US 8,574,394 B2

METHOD FOR PREPARING A MOISTURE CURABLE HOT MELT ADHESIVE

FIELD OF THE INVENTION

The invention relates a two-step polymerization process that can advantageously be used in the manufacture of high green strength moisture reactive hot melt adhesives.

BACKGROUND OF THE INVENTION

Hot melt adhesives are solid at room temperature but upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure. Advantages of hot melt curable adhesives over non-curing hot melt adhesives include improved temperature and chemical resistance.

The majority of reactive hot melts are moisture-curing urethane adhesives. These adhesives consist primarily of isocyanate terminated polyurethane prepolymers that react with surface or ambient moisture in order to chain-extend, forming a new polyurethane/urea polymer. Polyurethane prepolymers are conventionally obtained by reacting polyols with isocyanates. Additives are commonly included in reactive hot melt adhesive formulations to provide improved properties, such as improved green strength before solidification and increased cure speed. Cure is obtained through the diffusion of moisture from the atmosphere or the substrate into the adhesive and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material polymerized primarily through urea groups and urethane groups.

Moisture curing adhesives are generally prepared in a one-step polymerization method. While two step-polymerization method are know in the art, such as the processes disclosed in U.S. Pat. No. 6,365,700 and U.S. Pat. No. 7,074,297, there continues to be a need in the art for novel polymerization manufacturing processes for forming moisture reactive hot melt adhesives. The present invention addresses this need.

SUMMARY OF THE INVENTION

The current invention provides a novel process to make high green strength moisture reactive hot melt adhesives. It has been discovered that adding chain extenders in a second step after the main polyol/MDI reaction results in moisture curable hot melt adhesives having improved green strength.

One embodiment of the invention provides a method of manufacturing a moisture curable hot melt adhesive comprising:

(i) reacting excess isocyanate with an active hydrogen-containing compound to form a mixture comprising isocyanate terminated prepolymer, and (ii) adding to said mixture a chain extender to form an isocyanate terminated moisture curable hot melt adhesive.

In one preferred embodiment the chain extender is a polyol chain extender. In another preferred embodiment the chain extender is a polyamine chain extender.

Another embodiment of the invention is directed to a moisture curable hot melt adhesive prepared by the polymerization process described and claimed herein. The adhesives of the invention have surprisingly improved green strength.

Still another embodiment of the invention is directed to a method for bonding materials together which comprises applying the moisture reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Yet another embodiment of the invention is directed to a method of manufacturing articles prepared using the adhesive of the invention and to articles of manufacture comprising the adhesive of the invention which has been cured.

BRIEF DESCRIPTION OF THE DRAWING FIGURE

FIG. 1 illustrates diagrammatically the polymerization process of the invention.

Figure 2:
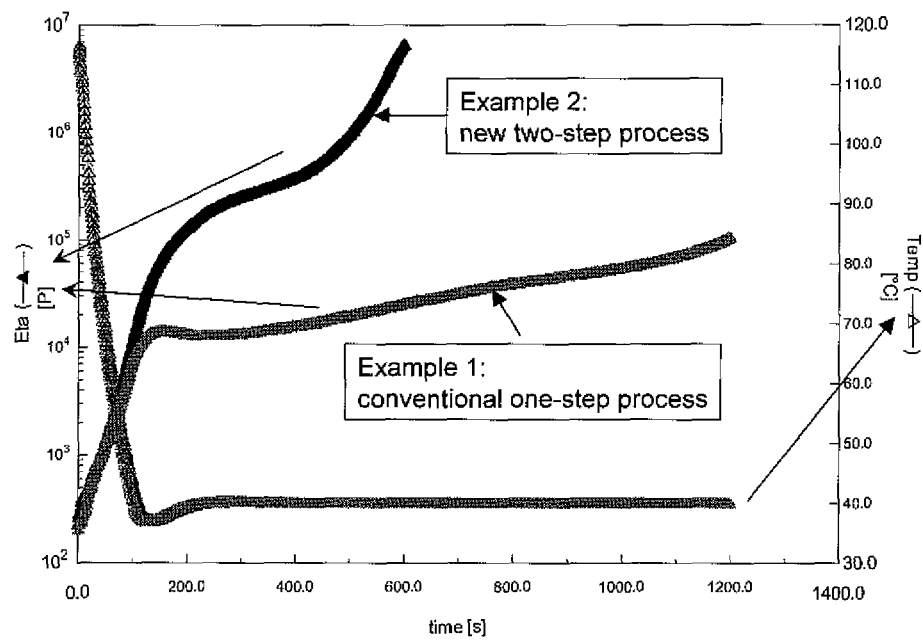

FIG. 2 compares the green strength of adhesives having the same compositional formulation, made with the process of the invention and the conventional one-step process.

DETAILED DESCRIPTION OF THE INVENTION

All percents are percent by weight of the adhesive composition, unless otherwise stated.

The term moisture reactive hot melt adhesive, moisture curable/curing hot melt adhesive and moisture curing urethane/polyurethane adhesives are used interchangeable herein. Moisture curing hot melt adhesives consist primarily of isocyanate-capped polyurethane prepolymers obtained by reacting diols (typically polyethers, polyesters and polybutadienes) with a polyisocyanate (most commonly methylene bisphenyl diisocyanate (MDI)). A stoichiometric imbalance of NCO to OH groups is required in order for moisture cure to proceed, cure being obtained through the diffusion of moisture from the atmosphere or the substrates into the adhesive and subsequent reaction of moisture with residual isocyanate.

The invention relates a two-step polymerization process that can advantageously be used in the manufacture of high green strength moisture reactive hot melt adhesives. The adhesive of the invention cures into a rigid and tough material.

While the prior art discloses ways of formulating a high green strength moisture reactive hot melt adhesives, improvements in green strength is obtained addition of various additives. For example, U.S. Pat. No. 5,021,507 teaches using acrylic to modify reactive hot melt; U.S. Pat. No. 5,115,073 teaches using polyesters with different melting points for green strength; U.S. Pat. No. 5,866,656 teaches using hydroxyl-functional thermoplastics for green strength, and U.S. Pat. No. 7,138,466 teaches using difunctionals having cyclics and dicyclics structures for high green strength.

It has now been discovered that moisture reactive hot melt adhesives having improved green strength can be obtained using a novel two-step polymerization process. In the process of the invention, a moisture curable hot melt adhesive is prepared by (i) forming a mixture comprising an isocyanate prepolymer and excess isocyanate and then (ii) adding to the reaction product formed in step (i) a chain extender to form an isocyanate terminated moisture curable hot melt adhesive.

The mixture formed in step (i) can be prepared by reacting excess isocyanate with an active hydrogen-containing compound. Active hydrogen-containing compounds include —OH (hydroxyl) group containing compounds such as polyols or hydroxyl containing chain extenders, —NH (amino) group containing compounds such as diamino or triamino polypropylene glycol or diamino or triamino polyethylene glycol, —SH (mercapto) group containing compounds such as polythiols, and —COOH (carboxyl) group containing compounds. Included are hydroxyl, amino, mercapto, and carboxyl-containing tackifiers or thermoplastic polymers. In one preferred embodiment, a mixture comprising an isocyanate prepolymer and excess isocyanate is prepared by reacting excess isocyanate with a polyol. In this embodiment, which is shown in FIG. 1, a polyol is reacted with excess isocyanate (e.g., MDI) in the first step to form an NCO-terminated prepolymer/excess MDI mixture. This mixture, or the prepolymer formed, is chain extended in a second polymerization step to form an NCO-terminated polyurethane hot melt adhesive.

In the process of the invention, an embodiment of which is illustrated diagrammatically in FIG. 1, a moisture curable hot melt adhesive is formed by reacting excess isocyanate with polyol to form a mixture comprising isocyanate terminated prepolymer and excess isocyanate. To this mixture is then added a chain extender to form an isocyanate terminated polyurethane hot melt adhesive. The chain extenders used in the practice of the invention are well known to those skilled in the polyurethane field. Non-limiting examples of useful chain extenders include polyol chain extenders such as ethylene glycol, 1,4-butane diol, 1,6-hexane diol, 1,4-bis(hydroxymethyl)cyclohexane (CHDM), p-di(2-hydroxyethoxy)benzene (HQEE), m-di(2-hydroxyethoxy)benzene (HER), trimethylolpropane (TMP), and low molecular weight polyether polyols; and polyamine chain extenders such as ethylenediamine (ED), and 2,4-diamino-3,5-diethyltoluene (Ethacure 100).

The urethane adhesive formed by this novel process exhibits improved green strength compared to formulation having the same composition but made from the conventional one-step process. The cured adhesive exhibits improved tensile properties including high elasticity. This new method provides a simple yet novel and unique way to achieve a high green strength reactive hot melt adhesive, which cures into a highly elastic material.

The adhesives of the invention comprise an isocyanate component. Non-limiting examples of useful isocyanate components include methyenebisphenyldiisocyanate (MDI), isophoronediisocyanate (IPDI), hydrogenated methylenebisphenyldiisocyanate (HMDI) and toluene diisocyanate (TDI). The isocyanate component is typically used in amounts of from about 5 to about 40 wt %.

The adhesive will also contain an active hydrogen-containing compound such as a polyol. Non-limiting examples include polyether polyols, polyester polyols and polybutadienes. The added polyol will typically be used in amounts of from about from about 0.01 to about 90 wt %

Other optional components may be added such as thermoplastic resins, (meth)acrylic polymers, and functionally modified polyolefin. Such polymers may be blended with the polyol prior to reaction thereof with the isocyanate, or may be added to the isocyanate terminated prepolymer.

The reactive hot melt compositions of the invention are useful in the manufacture of articles made of a wide variety of substrates (materials), including but not limited to wood, metal, polymeric plastics, glass and textiles. The adhesives find use in manufacture of consumer products and in specialized industrial applications. Markets where the adhesives find use includes textiles (e.g., carpet and clothing), food packaging, footwear, consumer, construction, furniture, automotive and aircraft. Applications include but are not limited to use in water towers, for bonding to exterior surfaces, bonding to wood with high levels of pitch and e.g., in marine and automotive applications, use as a glazing/backbedding compound in the manufacture of windows, use in the manufacture of doors including entry doors, garage doors and the like, use in the manufacture of architectural panels, use in bonding components on the exterior of vehicles, use in the manufacture of flooring and the like.

Any suitable compound, which contains two or more isocyanate groups, may be used for preparing the urethane prepolymers.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichloroh exa-methylene diisocyanate, furfurylidene diisocyanate, 1-chlorobenzene-2,4-diisocyanate, 4,4',4"-triisocyanatotriphenylmethane, 1,3,5-tri isocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methyenebisphenyldiisocyanate (MDI), isophoronediisocyanate (IPDI), hydrogenated MDI (HMDI) and toluene diisocyanate (TDI).

The prepolymer is most commonly prepared by the polymerization of a polyisocyanate with a polyol, most preferably the polymerization of a diisocyanate with a low molecular weight diol. Polyols useful in the practice of the invention include polyhydroxy ethers (substituted or unsubstituted polyalkylene ether glycols or polyhydroxy polyalkylene ethers), the ethylene or propylene oxide adducts of polyols and the monosubstituted esters of glycerol, polyamide polyols, acrylic polyols, crystalline, amorphous and/or liquid polyesters, castor oil and vegetable oils of different molecular weight and functionality, other fatty polyols, polybutadiene diol, polyisobutylene diol as well as mixtures thereof.

Examples of polyether polyols include a linear and/or branched polyether having hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include polyethers such as ARCOL PPG 2025 (Bayer), PolyG 20-56 (Arch) and PolyG 30-42 (Arch), polyamide polyols such as PAPOL polyol (Arizona Chemical), crystalline polyesters such as LEXOREZ 1130-30P, LEXOREZ 1150-30P and LEXOREZ 1151-35P from the LEXOREZ series from Inolex Chemical Co. DYNACOLL 7360, DYNACOLL 7361 series of resins available from Degussa, and FORMREZ 66-20 from Witco Chemical Company, poly-ε-caprolactones that are useful in the invention include the CAPA® series polyols from Solvay, amorphous or liquid polyesters such as Dynacoll 7230 (Degussa) and Stepanpol PD-56 (Stepan), and polybutadiene such as PolyBD R-45HTLO (Sartomer). "Polymer polyols" are also suitable, i.e., graft polyols containing a proportion of a vinyl monomer, polymerized in situ, e.g., Niax 34-28 (Union Carbide). Additional polyols include polycaprolactone diols and polycarbonate diols.

Examples of fatty polyols may include castor oil, the products of hydroxylation of unsaturated or polyunsaturated natural oils, the products of hydrogenations of unsaturated or polyunsaturated polyhydroxyl natural oils, polyhydroxyl esters of alkyl hydroxyl fatty acids, polymerized natural oils, soybean polyol and alkylhydroxylated amides of fatty acids.

The adhesive may optionally contain a thermoplastic polymer. The thermoplastic polymer may be either a functional or a non-functional thermoplastic. Example of suitable thermoplastic polymers include acrylic polymers, functional acrylic polymers, non-functional acrylic polymers, acrylic block copolymer, acrylic polymer having tertiary-alkyl amide functionality, polysiloxane polymers, polystyrene copolymers, polyvinyl polymers, divinylbenzene copolymers, polyetheramides, polyvinyl acetal, polyvinyl butyral, polyvinyl acetate, polyvinyl chloride, methylene polyvinyl ether, cellulose acetate, styrene acrylonitrile, amorphous polyolefin, olefin block copolymer [OBC], polyolefin plastomer, thermoplastic urethane, polyacrylonitrile, ethylene vinyl acetate copolymer, ethylene vinyl acetate terpolymers, functional ethylene vinyl acetate, ethylene acrylate copolymer, ethylene acrylate terpolymer, ethylene butadiene copolymers and/or block copolymers, styrene butadiene block copolymer, and mixtures thereof.

A number of suitable thermoplastic polymers are commercially available. Non-limiting examples include ethylene vinyl acetate copolymers such as the Elvax® EVA resins (DuPont), ethylene acrylate copolymers such as the Enable™ resins (ExxonMobil), and (methyacrylic polymers such as the Elvacite® resins (Lucite) and Degalan resins (Degussa).

The adhesive may also optionally contain a functionally modified polyolefin. A particularly useful functionally modified polyolefin is oxidized polyethylene. The number average molecular weight of the functionally modified polyolefins is in the range of about 50 to 100,000, more preferably about 100 to 10,000. Non-limiting examples include EE-2 polymer, which is commercially available from Westlake Chemical, and the EPOLENE® series, available from Eastman Chemical Company.

The adhesives may also, if desired, be formulated with other conventional additives which are compatible with the composition. Such additives include defoamers, plasticizers, compatible tackifiers, curing catalysts, dissociation catalysts, fillers, rheology modifiers, anti-oxidants, pigments, adhesion promoters, stabilizers, aliphatic $C_5$-$C_{10}$ terpene oligomers, bituminous materials and the like. Thixotropic agents, such as fumed silica, may also be added to provide sag resistance. Conventional additives that are compatible with a composition according to this invention may simply be determined by combining a potential additive with the composition and determining if they are compatible. An additive is compatible if it is homogenous within the product. Non-limiting examples of suitable additives include, without limitation, rosin, rosin derivatives, rosin ester, aliphatic hydrocarbons, aromatic hydrocarbons, aromatically modified aliphatic hydrocarbons, terpenes, terpene phenol, modified terpene, high molecular weight hindered phenols and multifunctional phenols such as sulfur and phosphorous-containing phenol, terpene oligomers, DMDEE, silanes, paraffin waxes, microcrystalline waxes and hydrogenated castor oil. The reactive hot melt adhesives of the invention may also contain flame retardant components.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt begins to cool from its application temperature to room temperature. Curing, i.e. chain extending, to a composition that has an irreversible solid form, takes place in the presence of ambient moisture.

The invention is further illustrated by the following non-limiting examples.

Example 1

Conventional One-Step Process

To a reactor equipped with a stir paddle and a vacuum line, was charged in 60 parts of Dynacoll 7360 (Degussa), 13.7 parts of PPG 425 (Bayer), and 3.0 parts of HER HP (Indespec). The ingredients were melted at 250-270° F. with vacuum applied to strip moisture away. 23.3 parts of MDI where added to the mixed and dried ingredients and allowed to react for 2-3 hours at 250-270° F. A batch was then drawn off testing.

Example 2

Novel Two-Step Process

To a reactor equipped with a stir paddle and a vacuum line, was charged in 60 parts of Dynacoll 7360 (Degussa) and 13.7 parts of PPG 425 (Bayer). The ingredients were melted at 250-270° F. with vacuum applied to strip moisture away. 23.3 parts of MDI were added to the mixed and dried ingredients and allowed to react for 1-2 hours at 250-270° F. 3.0 parts of HER HP (Indespec) were added to the Dynacoll 7360, PPG 425, and MDI reaction mixture and allowed to react for 1-3 hours at 250-270° F. A batch was then drawn off for testing.

Example 3

Adhesive batch sample 1 (prepared in accordance with example 1 using the conventional single step polymerization) and adhesive batch sample 2 (prepared in accordance with example 2 using the two-step process of the invention) were tested for green strength and set speed.

Green strength and set speed were differentiated using the Rheometric ARES Rheometer with nitrogen controller. In this test, the viscosity (Eta) of a sample of adhesive as a function of time was recorded as the sample was quench cooled from application temperature via liquid nitrogen to a chosen temperature and step rate tested at the chosen temperature. By comparing the viscosity and the onset of transitions of different adhesives at the chosen temperature, the green strength and set speed of different adhesives were ranked. In this test, the higher the viscosity developed at a chosen temperature and the earlier the crystallization transition occurs, the higher the green strength and the faster the set speed of the adhesive. A 25 mm parallel plate fixture was used in this test. The machine was set at an application temperature off 120° C., a melted sample of adhesive was loaded onto the plate and the gap was set at 1 mm. The target end temperature was set at 40° C. and the shear rate was set at 0.1 [1/s]. The step rate testing results of the adhesive samples of Examples 1 and 2 are shown in FIG. 2.

As shown in FIG. 2, the formulations prepared using the two-step polymerization process of the invention had improved green strength and set speed as compared with the same formulation prepared using a conventional one-step polymerization method.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I claim:

1. A method of forming a moisture curable hot melt adhesive comprising:
   forming an isocyanate terminated prepolymer by reacting at least one of 4,4' methylene bisphenyl diisocyanate (MDI), hydrogenated 4,4' methylene bisphenyl diisocyanate (MDI) and hexamethylene diisocyanate with at least one polyol, wherein the polyol is not a polyhydroxy ester of alkyl fatty acids or an ethylene oxide adduct of a polyol, and
   (ii) chain extending said prepolymer by reaction with a chain extender including at least one of ethylene glycol, 1,4-butane diol, 1,6-hexane diol, 1,4-bis(hydroxymethyl)cyclohexane, p-di(2-hydroxyethoxy)benzene, m-di(2-hydroxyethoxy)benzene (HER), trimethylolpropane (TMP) and 2,4-diamino-3,5-diethyltoluene to form an isocyanate terminated moisture curable hot melt adhesive.

2. The method of claim 1 wherein said prepolymer is formed by reacting excess diisocyanate with the polyol.

3. The method of claim 1, wherein step (i) comprises:
   (i) forming a mixture comprising 4,4' methylene bisphenyl diisocyanate (MDI) and the isocyanate terminated prepolymer.

4. The method of claim 1 wherein the chain extender is selected from p-di(2-hydroxyethoxy)benzene, m-di(2-hydroxyethoxy)benzene (HER) or a mixture thereof.

5. The method of claim 1 wherein the chain extender is 2,4-diamino-3,5-diethyltoluene.

6. A moisture curable hot melt adhesive prepared by the method of claim 1.

7. A method of bonding materials together which comprises providing the moisture curable hot melt adhesive of claim 6 in solid form; heating the moisture curable hot melt adhesive to a liquid or fluid state; applying the heated moisture reactive hot melt adhesive to a first substrate, bringing a second substrate in contact with the moisture curable hot melt adhesive applied to the first substrate, subjecting the substrates and applied moisture curable hot melt adhesive to conditions which will allow the moisture curable hot melt adhesive to cool to room temperature and solidify; subjecting the solidified moisture curable hot melt adhesive to moisture to cure the hot melt adhesive to an irreversible solid form.

8. A process for manufacturing an article, comprising applying the adhesive of claim 6 to a substrate surface and bringing a second substrate surface in contact with said first substrate surface.

9. An article of manufacture comprising the adhesive of claim 6 which has been cooled to a solid state at room temperature but is not cured.

10. The method of claim 1 wherein the polyol further comprises a polyether polyol.

11. The method of claim 1 wherein the polyol comprises a mixture of crystalline polyester polyol and polyether polyol.

12. A method of forming a moisture curable hot melt adhesive comprising:
   forming an isocyanate terminated prepolymer by reacting an excess of 4,4' methylene bisphenyl diisocyanate (MDI), hydrogenated 4,4' methylene bisphenyl diisocyanate (MDI) and hexamethylene diisocyanate with a mixture of polyether polyol and non-polyether polyol, and
   chain extending the prepolymer by reaction with a chain extender including at least one of ethylene glycol, 1,4-butane diol, 1,6-hexane diol, 1,4-bis(hydroxymethyl)cyclohexane, p-di(2-hydroxyethoxy)benzene, m-di(2-hydroxyethoxy)benzene (HER), trimethylolpropane (TMP) and 2,4-diamino-3,5-diethyltoluene to the isocyanate terminated prepolymer to form the moisture curable hot melt adhesive.

13. The method of claim 1 wherein the at least one polyol comprises crystalline polyester polyol.

14. A moisture curable hot melt adhesive comprising the isocyanate terminated prepolymer of claim 1.

15. An article of manufacture comprising cured reaction products of the adhesive of claim 1.

* * * * *